United States Patent
Saldhana (10) Patent No.: US 9,509,504 B2
(45) Date of Patent: Nov. 29, 2016

(54) CRYPTOGRAPHIC KEY MANAGER FOR APPLICATION SERVERS

(75) Inventor: Anil Saldhana, Oak Park, IL (US)

(73) Assignee: Red Hat, Inc., Raleigh, NC (US)

(*) Notice: Subject to any disclaimer, the term of this patent is extended or adjusted under 35 U.S.C. 154(b) by 318 days.

(21) Appl. No.: 13/211,674

(22) Filed: Aug. 17, 2011

(65) Prior Publication Data

US 2013/0046988 A1    Feb. 21, 2013

(51) Int. Cl.
  *H04L 29/06* (2006.01)
  *H04L 9/32* (2006.01)
  *H04K 1/00* (2006.01)
  *G06F 11/30* (2006.01)
  *G06F 12/14* (2006.01)
  *H04L 9/08* (2006.01)
  *G06F 21/62* (2013.01)
  *G06F 21/10* (2013.01)

(52) U.S. Cl.
  CPC .............. *H04L 9/083* (2013.01); *G06F 21/10* (2013.01); *G06F 21/62* (2013.01); *H04L 9/088* (2013.01); *H04L 9/0891* (2013.01); *H04L 63/10* (2013.01); *H04L 63/20* (2013.01)

(58) Field of Classification Search
  CPC .... G06F 21/33; G06F 21/6218; G06F 21/62; G06F 21/602; G06F 21/57; H04L 63/08; H04L 63/0823; H04L 9/3281; H04L 63/10; H04L 63/20; H04L 9/3263; H04L 9/3268; H04L 67/10; H04L 9/14; H04L 9/083; H04L 9/088; H04L 9/0891; H04W 12/04
  USPC .......... 713/150, 175, 168, 171, 155; 380/28, 380/29, 44, 278, 273; 726/1, 18, 26, 27
  See application file for complete search history.

(56) References Cited

U.S. PATENT DOCUMENTS

| | | | | |
|---|---|---|---|---|
| 4,423,287 | A * | 12/1983 | Zeidler | 705/71 |
| 4,578,530 | A * | 3/1986 | Zeidler | 705/71 |
| 7,234,060 | B1 * | 6/2007 | Amdur et al. | 713/176 |
| 7,243,366 | B2 * | 7/2007 | Medvinsky et al. | 726/2 |
| 7,349,970 | B2 * | 3/2008 | Clement et al. | 709/228 |
| 7,916,870 | B2 * | 3/2011 | Mergen | 380/278 |
| 8,046,826 | B2 * | 10/2011 | Sheehan | 726/6 |
| 8,208,627 | B2 * | 6/2012 | Pauker et al. | 380/28 |
| 8,281,389 | B2 * | 10/2012 | Beaver et al. | 726/18 |
| 2004/0128535 | A1 * | 7/2004 | Cheng | 713/201 |

(Continued)

OTHER PUBLICATIONS

Rouse, Magaret, and Andre Patkos. "What Is Session Key?—Definition from WhatIs.com." SearchSecurity. TechTarget, Published, Sep. 2005; Accessed, Web. Feb. 24, 2016; http://searchsecurity.techtarget.com/definition/session-key.*

*Primary Examiner* — Saleh Najjar
*Assistant Examiner* — Feliciano Mejia
(74) *Attorney, Agent, or Firm* — Lowenstein Sandler LLP (57) ABSTRACT

Embodiments relate to systems and methods for maintaining cryptographic keys for application servers. In particular, applications and/or services of the application servers can desire to encrypt and/or decrypt data during operation of the applications. A key management tool can receive requests, and associated digital certificates from applications of the application servers for associated keys for use by the applications to encrypt and/or decrypt the data. The key management tool can generate a new key for the applications, or locate and retrieve an existing key for the applications. Further, the key management tool can provide a copy of the key to the applications.

16 Claims, 5 Drawing Sheets

(56) References Cited

U.S. PATENT DOCUMENTS

| | | |
|---|---|---|
| 2005/0235152 A1* | 10/2005 | Ozaki et al. ............... 713/170 |
| 2008/0056501 A1* | 3/2008 | McGough .................. 380/281 |
| 2008/0107271 A1* | 5/2008 | Mergen ..................... 380/278 |
| 2008/0162259 A1* | 7/2008 | Patil et al. .................. 705/10 |
| 2009/0235343 A1* | 9/2009 | Sheehan ..................... 726/7 |
| 2009/0296942 A1* | 12/2009 | Burckart et al. ............ 380/282 |
| 2009/0300356 A1* | 12/2009 | Crandell .................... 713/170 |
| 2010/0111087 A1* | 5/2010 | Lindgren ........... H04L 67/306 370/392 |
| 2011/0167266 A1* | 7/2011 | Mergen ..................... 713/168 |
| 2011/0231659 A1* | 9/2011 | Sinha ........................ 713/168 |
| 2012/0131354 A1* | 5/2012 | French ...................... 713/189 |
| 2012/0260321 A1* | 10/2012 | Wendt et al. ................. 726/5 |

* cited by examiner

CRYPTOGRAPHIC KEY MANAGER FOR APPLICATION SERVERS

FIELD

The invention relates generally to systems and methods for maintaining security, and more particularly, to platforms and techniques for maintaining a central key management tool for use by application servers.

BACKGROUND

Application servers are entities in system and network environments in which various applications or services can execute or operate. In particular, application servers are dedicated to the efficient execution of processes, procedures, routines, scripts, and software code for supporting the functionalities of applications and services. Software developers can access application servers via various application programming interfaces (APIs).

The Java Platform, Enterprise Edition, Java EE, or J2EE are widely used platforms for server programming in the Java programming language. A J2EE container is a runtime entity that provides services to specialized Java components. Services provided by a container typically include life cycle management, security, deployment, and component-specific services. Containers are used in a wide variety of Java components, such as Enterprise Javabeans (EJB), Web pages, Java Server Pages (JSP), servlets, applets, and application clients.

During operation of a Java EE application server, various services may need to encrypt and/or decrypt information during operation of the applications and services. In particular, encrypting and decrypting information can sometimes be accomplished using cryptographic keys. However, most of the applications use their own cryptographic keys during operation of the applications. Because the cryptographic keys have different parameters, expiration policies, and other factors, it may be desirable to provide systems and methods for providing a central key management tool. In particular, it may be desirable to provide systems and methods for providing a central key management tool that manages cryptographic keys for applications of an application server.

DESCRIPTION

Embodiments of the present teachings relate to systems and methods for maintaining security in a network. In particular, embodiments relate to platforms and techniques for generating and maintaining a cryptographic keys ("keys") for a set of applications or services of a set of application servers. A key management tool or similar logic or resources can be configured to connect to a set of application servers. In embodiments, the set of application servers can each be configured with a set of applications.

The key management tool can be configured to generate keys and/or maintain keys for the applications of the set of applications. In particular, an application can request a symmetric or other type of key from the key management tool, which can be configured to validate the application via a digital certificate, generate a key for the application, locate an existing key for the application, or other functions. In embodiments, the key management tool can examine policies to determine whether to expire a key, destruct a key, or other functions.

Figure 1:
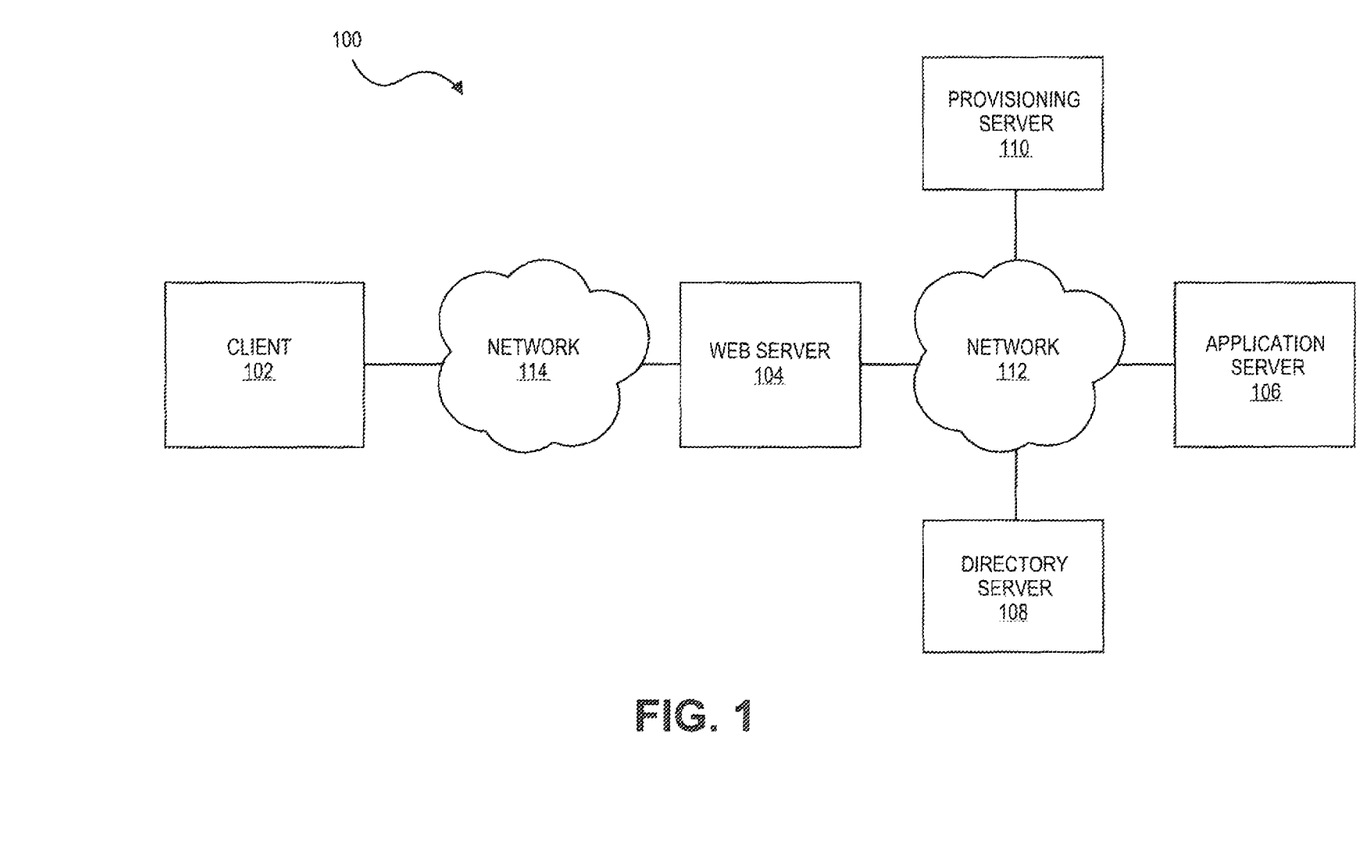
FIG. 1 illustrates an overall system architecture in which various aspects of systems and methods for maintaining security can be practiced, according to embodiments.

Referring to FIG. 1, illustrated is an exemplary environment 100 in which the present systems and methods may be implemented. As shown in FIG. 1, the environment 100 can comprise a client 102, a web server 104, an application server 106, a directory server 108, and a provisioning server 110. These components can be coupled together via networks 112 and 114, respectively, or other networks. It should be appreciated that other configurations and inclusions of other components are envisioned in accordance with the present systems and methods.

In embodiments, the client 102 can be any computer system that utilizes the services of another computer system, i.e., the web server 104 and the application server 106. As shown in FIG. 1, the client 102 can be implemented using components well known to those skilled in the art, such as a personal computer, laptop computer, personal digital assistant, mobile phone, tablet device, and the like. In the embodiments as shown in FIG. 1, the client 102 can be used to run Web applications via an application, such as a web browser.

In embodiments, the web server 104 can be a computer system configured to accept requests from clients, such as the client 102, and serve responses along with optional data contents. For example, a user of the client 102 can execute a Web application via the web server 104. In the embodiment as shown, the data content served by the web server 104 can be one or more Web pages that can include hypertext markup language (HTML) documents and linked objects such as, for example, images, video, audio, and the like.

The web server 104 can be implemented on a machine that comprises well known hardware and software. Well known software for the web server 104 can include, but is not limited to, software such as Apache HTTP Server from the Apache Software Foundation, Internet Information Services by Microsoft Corporation®, and Sun Java System Web Server from Sun Microsystems Inc®. One skilled in the art will recognize that any of the many different Web server programs available are consistent with the principles of the present invention.

The application server 106 can be software that provides applications to the client 102. In particular, the application server 106 can be configured to handle security, business logic, and data access for the applications provided to the client 102. In embodiments, the application server 106 can be configured to provide a variety of Web-based applications, such as e-commerce applications, content management applications, customer relations management applications, and the like.

The application server 106 can be implemented on various software platforms. For example, the application server 106 can be implemented on the well known J2EE platform from Sun Microsystems Inc®. In addition, the application server 106 can comprise middleware configured to enable applications to intercommunicate with dependent applications, such as the web server 104, database management systems, etc.

In further embodiments, the application server 106 can be implemented using well known software. For example, the application server 106 can be implemented using software, such WebLogic server from BEA Systems Inc®., JBoss from Red Hat Inc.®, Websphere from the IBM Corporation®, and the like. Accordingly, the application server 106 can implement the Java programming language and provide Web modules using servlets and JavaServer pages. Other functions of the application server 106 can also employ Java. For example, business logic provided by the application server 106 can be built into Enterprise JavaBeans (EJBs). J2EE can provide standards for containing the Web components. In addition, security services, such as authentication and authorization, can be implemented using the Java Authentication and Authorization Service (JAAS) or similar service.

The directory server 108 can represent the components that store and organize information about the users of the system 100 and an administrator of the system 100 to manage those users' access to the resources of the system 100. In embodiments, the directory server 108 can comprise a database (not shown) that can store information about named objects that are managed. The directory server 108 can also provide the access interface to the data that is contained in this database. The directory server 108 can be implemented using well known technologies. For example, the directory server 108 can be implemented as an X.509 directory service or Lightweight Directory Access Protocol (LDAP) service. In embodiments, the directory server 108 can be implemented as services from various vendors such as, for example, Red Hat Directory Server from Red Hat Inc.®, Active Directory by the Microsoft Corporation®; Apache Directory Server by the Apache Software Foundation; and Sun Java System Directory Server by Sun Microsystems Inc®.

In embodiments, the provisioning server 110 can be software, hardware, or a combination thereof that can be configured to listen for provisioning requests in the system 100 and return provisioning responses. In some embodiments, the provisioning server 110 can be configured as a service provisioning markup language (SPML) provisioning service provider. The provisioning server 110 can be implemented as a separate software component of the system 100 or can be integrated with other components of the system 100. For example, the provisioning server 110 can be a component that is installed as part of the directory server 108.

In embodiments, the network 114 can represent the communications infrastructure for allowing the client 102 and the web server 104 to communicate with each other. For example, the network 114 can represent the Internet, which is a worldwide, publicly accessible network that uses the Internet Protocol (IP) suite of standards. In embodiments, the network 112 can represent the communications infrastructure that allows the web server 104, the application server 106, the directory server 108, and the provisioning server 110 to communicate with each other. In embodiments, the network 112 can be implemented as a local area network or may utilize one or more larger networks, such as the Internet.

Figure 2:
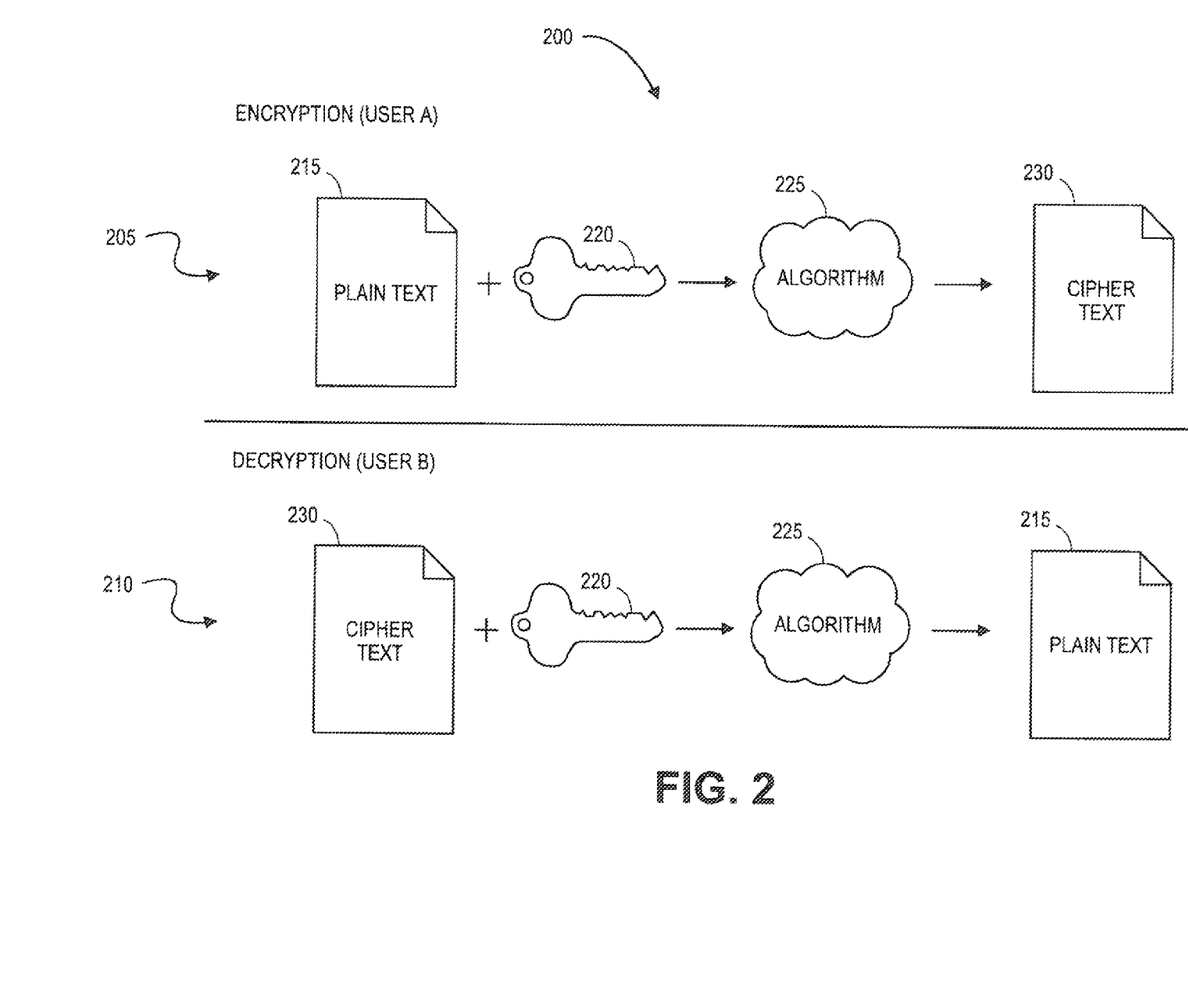
FIG. 2 is an exemplary illustration of cryptographic key functionality, according to various embodiments.

FIG. 2 is an exemplary illustration of a symmetric key cryptography technique 200. It should be appreciated that the technique 200 as illustrated in FIG. 2 is merely exemplary and can comprise other elements, steps, processing ordering, and the like.

The technique 200 comprises both an encryption 205 and a decryption 210 of data. In embodiments, a user, such as User A, can represent an entity that encrypts the data, and an additional user, such as User B, can represent an entity that receives the encrypted data from User A, and decrypts the encrypted data. In embodiments as shown, the unencrypted data can start out as, for example, a plaintext document 215. Each of User A and User B can possess a symmetric key 220 that corresponds to an algorithm 225 that can be used to either encrypt or decrypt data.

As shown in FIG. 2, User A can use the symmetric key 220 and the associated algorithm 225 to encrypt the plaintext document 215 to generate a cipher text document 230. In embodiments, the cipher text 230 document can be sent to User B via a communication network or a direct transfer. Once User B receives the cipher text 230 document, User B can use the symmetric key 220 and the associated algorithm 225 to decrypt the cipher text document 230 into the plaintext document 215. In embodiments, the associated algorithm 225 can perform an opposite operation from the operation performed by the algorithm 225 of User A. Once the cipher text document 230 is decrypted, User B can access a copy of the plaintext document 215 that was originally encrypted by User A.

Figure 3:
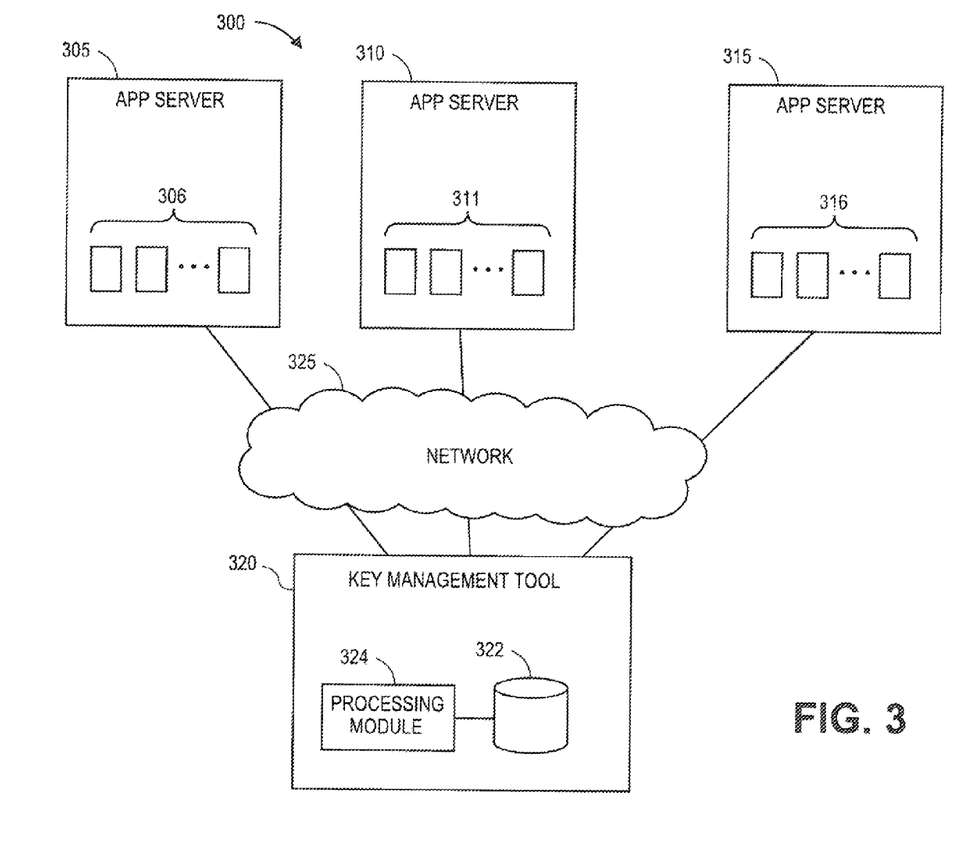
FIG. 3 illustrates an exemplary configuration of components in which various aspects of systems and methods for maintaining security can be practiced, according to embodiments.

FIG. 3 illustrates a detailed embodiment of a key management system 300. In embodiments, the system 300 can comprise a set of application servers 305, 310, 315. According to embodiments, the set of application servers 305, 310, 315 can all belong to a cluster, or, in embodiments, one or more of the set of application servers 305, 310, 315 can comprise a cluster. For example, application servers 305, 310 can belong to a cluster, and application server 315 can join or leave the cluster at any point. Further, in embodiments, the application servers 305, 310, 315 can be a JBoss application server, or other types of application servers.

As shown in FIG. 3, each of the application servers 305, 310, 315 can comprise a set of applications 306, 311, 316 such as, for example, user-deployed applications. In embodiments, the sets of applications 306, 311, 316 can correspond to sets of services that can be executed by the corresponding application server 305, 310, 315. For example, the services can be Enterprise JavaBean (EJB) services, web applications services, Java Connector Architecture (JCA) services, and other services. In embodiments, the number of applications 306, 311, 316 in each of the application servers 305, 310, 315 can vary. For example, the set of applications 306 in the application server 305 can comprise a file management application and a web-based storefront application. The sets of applications 306, 311, 316 in the application servers 305, 310, 315 can be configured to encrypt or decrypt information during operation of any of the sets of applications 306, 311, 316. For example, an application may need to encrypt data that is sent to a smart phone or other mobile device. For further example, the application may need to decrypt data that is received from the smart phone or other mobile device.

As shown in FIG. 3, the system 300 can further comprise a key management tool 320, wherein each of the application servers 305, 310, 315 can be configured to connect to the key management tool 320 via, for example, a network 325 or other connections. In embodiments, the network 325 can be any wired or wireless data network such as the Internet or other public or private networks. According to embodiments, the key management tool 320 can be configured to generate, escrow, store, update, delete, and/or maintain cryptographic keys, or keys, that can correspond to any of the application servers 305, 310, 315 as well as to any of the sets of applications 306, 311, 316 or services. In embodiments, the keys generated, escrowed, stored, updated, deleted, and/or maintained by the key management tool 320 can comprise public and/or private keys that can be used in symmetric and/or asymmetric key algorithms. It should be appreciated that the key management tool 320 can be configured to manage keys that can be used in other cryptographic algorithms.

As shown in FIG. 3, the key management tool 320 can comprise a processing module 324 and a database 322. The processing module 324 can be configured to perform or otherwise execute the functions of the key management tool 320, and the database 322 can be configured to store any associated keys. For example, the processing module 324 can generate keys to be used by the sets of applications 306, 311, 316. Further, for example, the processing module 324 can be configured to provide keys to the database 322 for storage. It should be appreciated that the processing module 324 and the database 322 can perform other functions in accordance with embodiments as described herein.

According to embodiments, the sets of applications 306, 311, 316 or the corresponding application servers 305, 310, 315 can be configured to request a new or existing key from the key management tool 320. In embodiments, the sets of applications 306, 311, 316 or the corresponding application servers 305, 310, 315 can use a certificate such as, for example, an X509 digital certificate, or other certificates, to validate itself to the key management tool 320. In response to receiving the certificate, the processing module 324 can be configured to examine the certificate and validate the requesting entity. Further, in response to receiving the request or validating the entity, the processing module 324 can be configured to generate a key for the requesting application or application server. In embodiments, the sets of applications 306, 311, 316 can be configured to request access to an existing key stored in the database 322 of the key management tool 320. Further, the processing module 324 can be configured to provide a copy of the key to the requesting application, which can use the copy of the key to encrypt or decrypt data, as necessary.

For example, assume that a web-based storefront application needs to encrypt data to send to a user purchasing a product. If the storefront application does not have an associated key to encrypt the data, the storefront application can send a request to the key management tool 320, along with an X509 digital certificate, to have the processing module 324 generate a key for the storefront application. The processing module 324 can examine the X509 digital certificate to validate the storefront application, create a copy of the key, and provide the copy of the key to the storefront application via, for example, the network 325. Upon receipt of the copy of the key, the storefront can use the key to encrypt data, such as shopping cart data, to the user, as well as decrypt data sent by the user.

In other embodiments, the processing module 324 can be configured to store or maintain existing keys for any of the sets of applications 306, 311, 316. For example, if the application 306 sends a request to the key management tool 320 to access the key corresponding to the application 306, the processing module 324 can retrieve a copy of the key from the database 322 and provide the copy of the key to the application 306, which can use the copy of the key to encrypt or decrypt data, as necessary.

In embodiments, the key management tool 320 and/or components thereof can be configured to maintain a set of policies related to the keys. For example, one policy can dictate when keys are to expire, and another policy can dictate the destruction of keys. It should be appreciated that other key policies, and combinations of key policies, are envisioned. In embodiments, the set of policies can be tailored to individual application servers 305, 310, 315 or individual sets of the applications 306, 311, 316 or services. The processing module 324 can be configured to examine any associated policies to determine if any apply. For example, one policy can state that all keys in the database 322 are to expire at midnight every Sunday. As such, at midnight each Sunday, the processing module 324 can mark all the keys stored in the database 322 as expired. For further example, another policy can state that a key is to be destroyed after being used by the sets of applications 306, 311, 316 two times. As such, once a key is used by one or more of the applications 306, 311, 316 a total of two times, the processing module 324 can access that key from the database 322 and delete it from storage. In embodiments, a user, administrator, or other entity can specify the applicable policies for the keys.

Figure 4:
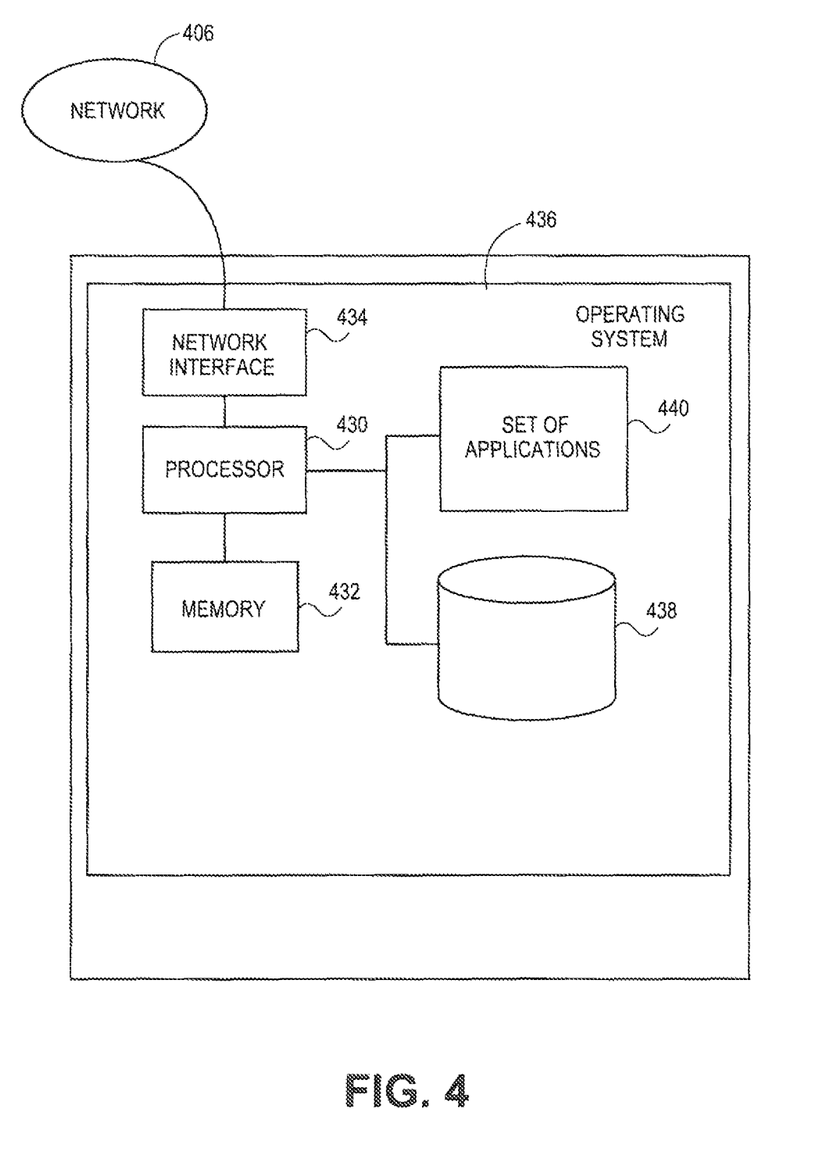
FIG. 4 illustrates an exemplary hardware configuration for a key management tool, according to various embodiments.

FIG. 4 illustrates an exemplary diagram of hardware and other resources that can be incorporated in the key management tool 320 configured to communicate with a set of application servers, and/or other entities, services, or resources via one or more networks 406 and/or other connections, according to aspects. In embodiments as shown, the key management tool 320 can comprise a processor 430 communicating with memory 432, such as electronic random access memory, operating under control of or in conjunction with an operating system 436. The operating system 436 can be, for example, a distribution of the Linux™ operating system, the Unix™ operating system, or other open-source or proprietary operating system or platform. The processor 430 can also communicate with a database 438, such as a database stored on a local hard drive, and a set of applications 440, to execute control logic and control the operation of the resources as described herein. The processor 430 can further communicate with a network interface 434, such as an Ethernet or wireless data connection, which in turn communicates with the one or more networks 406, such as the Internet or other public or private networks. Other configurations of the key management tool 320, associated network connections, and other hardware, software, and service resources are possible.

Figure 5:
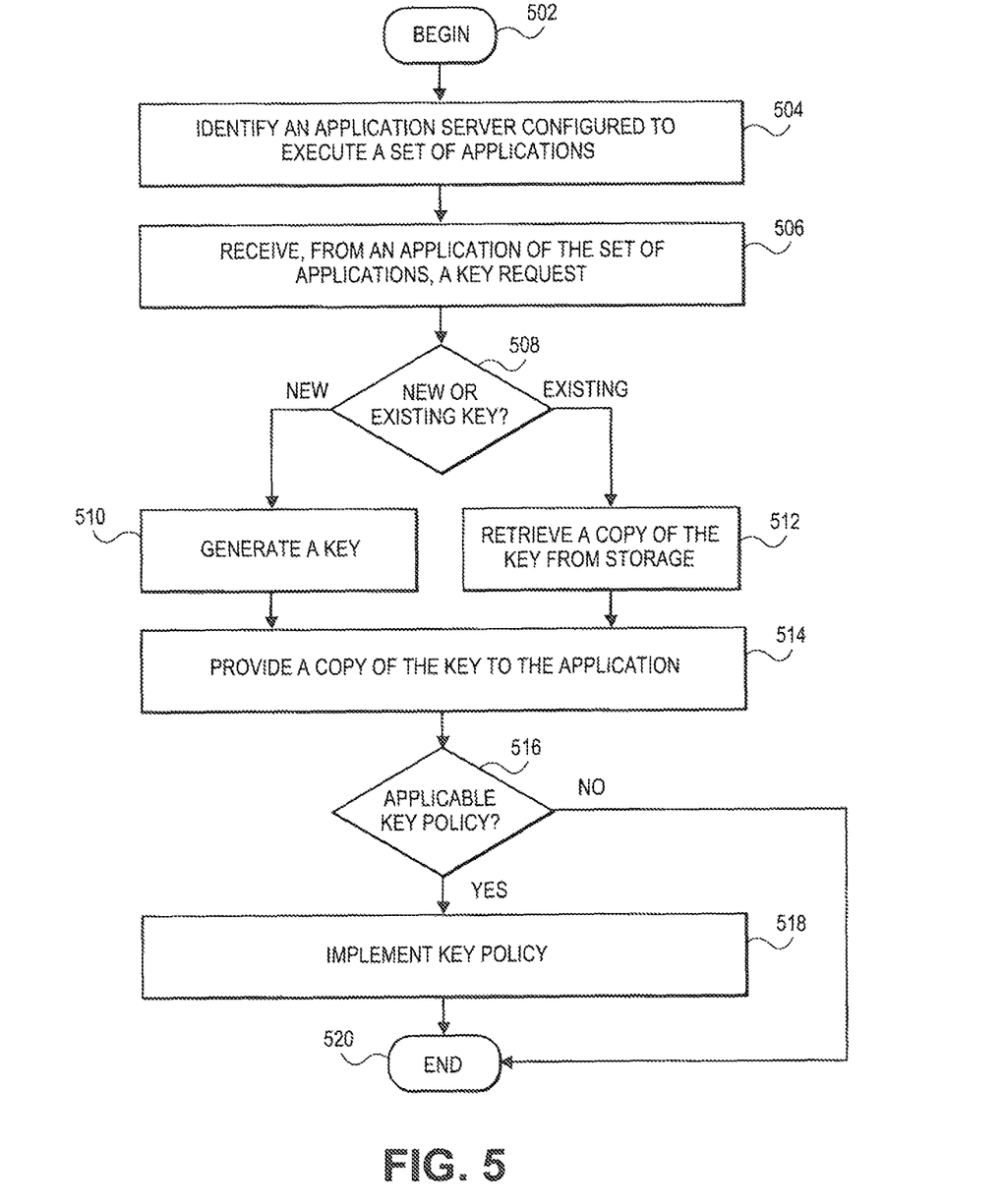
FIG. 5 illustrates a flowchart for managing cryptographic keys for an application server, according to various embodiments.

FIG. 5 illustrates a flowchart of overall processing that can be used to maintain keys across a cluster of application servers, according to various aspects of the present teachings. In 502, processing can begin. In 504, an application server configured to execute a set of applications can be identified. In embodiments, the application server can be a part of a cluster of application servers. In 506, a key request can be received from an application of the set of applications. In embodiments, the key request can specify a symmetric key that can be used by the application to encrypt and/or decrypt data.

In 508, the processing module 324 or other logic can determine whether the key request corresponds to a new key or to an existing key for the application. For example, if the application does not have a key, or the application's key is expired, then the key request can be for a new key. For further example, if the application already has a key that is not expired, the key request can be for an existing key. If a new key is required, then processing can proceed to 510 in which a new key can be generated. In embodiments, the key can be stored in memory such as, for example, the database 322. In other embodiments, the processing module 324 or other logic can examine any associated digital certificate to validate the requesting application. If, on the other hand, an existing key for the application exists, then processing can proceed to 512 in which the application's existing key can be retrieved from storage such as, for example, the database 322. In embodiments, the processing module 324 or other logic can generate a copy of the existing key.

In 514, a copy of the key can be provided to the application. In embodiments, the processing module 324 or other logic can record when the copy of the key is provided to the application. In 516, the processing module 324 or other logic can determine whether an applicable key policy exists for the key. In embodiments, the key policy can be an expiration policy, a destruction policy, or other policies. If there is an applicable key policy, then processing can proceed to 518 in which the key policy can be implemented. For example, if a key expiration policy applies, then the processing module 324 or other logic can mark the key as expired. For further example, if a key destruction policy applies, then the processing module 324 or other logic can delete the key from storage. If, on the other hand, there is not an applicable key policy, then processing can proceed to 520. In 520, processing can repeat, return to a prior processing point, jump to a further processing point, or end.

The foregoing description is illustrative, and variations in configuration and implementation may occur to persons skilled in the art. For example, while embodiments have been described in which the key management tool 320 resides in a single server or platform, in embodiments the key management tool 320 and associated logic can be distributed among multiple servers, services, or systems. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
   identifying, from a plurality of application servers, a first application server to execute a first set of applications;
   receiving, by a processor executing a key management tool from an application of the first set of applications, a key request and a digital certificate associated with the key request, wherein the key request specifies a symmetric key, wherein the key management tool is to maintain a plurality of keys and a plurality of key policies related to the plurality of keys;
   validating, by the processor executing the key management tool, the application by examining the digital certificate;
   determining, by the processor executing the key management tool, whether the key request corresponds to an existing key of the plurality of keys stored in a database of the key management tool in response to receiving the key request and validating the application, wherein the plurality of keys corresponds to a plurality of sets of applications executed by the plurality of application servers, and wherein the plurality of sets of applications comprises the first set of applications;
   identifying, by the processor executing the key management tool, the existing key of the plurality of keys stored in the database in response to determining that the key request corresponds to the existing key;
   identifying, from the plurality of key policies associated with the plurality of application servers, a key policy of a set of key policies tailored to the first application server and used to determine key validity, wherein each of the plurality of key policies is tailored to an individual application server of the plurality of application servers;
   determining whether the existing key is valid in view of the key policy;
   in response to determining that the existing key is valid in view of the key policy, providing a copy of the existing key to the application;
   recording when the copy of the existing key is provided to the application; and
   applying the key policy to the existing key in view of the recording.

2. The method of claim 1, further comprising:
   identifying a key expiration policy; and
   managing an expiration of the existing key in accordance with the key expiration policy.

3. The method of claim 2, wherein identifying the key expiration policy comprises:
   receiving an indication of the key expiration policy; and
   storing, in the database, the indication of the key expiration policy.

4. The method of claim 1, further comprising:
   identifying a key destruction policy; and
   managing a destruction of the existing key in accordance with the key destruction policy.

5. The method of claim 4, wherein identifying the key destruction policy comprises:
   receiving an indication of the key destruction policy; and
   storing, in the database, the indication of the key destruction policy.

6. The method of claim 1, wherein identifying the existing key comprises:
   examining the key request, in response to the validating the application, to identify an indication of the existing key; and
   retrieving, from the database, the existing key.

7. The method of claim 1, wherein the first application server is a JAVA™ Enterprise Edition (EE) application server.

8. The method of claim 1, further comprising:
   maintaining the copy of the existing key in the database.

9. A system comprising:
   an interface to a key management tool, the key management tool to maintain a plurality of keys and a plurality of key policies related to the plurality of keys; and
   a hardware processor operatively coupled to execute the key management tool via the interface, the hardware processor to:
   identify, from a plurality of application servers, a first application server to execute a first set of applications;
   receive from an application of the first set of applications, a key request and a digital certificate associated with the key request, wherein the key request specifies a symmetric key;
   validate the application by examining the digital certificate;
   determine whether the key request corresponds to an existing key of the plurality of keys stored in a database of the key management tool in response to receiving the key request and validating the application, wherein the plurality of keys corresponds to a plurality of sets of applications executed by the plurality of application servers, and wherein the plurality of sets of applications comprises the first set of applications;

identify the existing key of the plurality of keys stored in the database in response to determining that the key request corresponds to the existing key;

identify, from the plurality of key policies associated with the plurality of application servers, a key policy of a set of key policies tailored to the first application server and used to determine key validity, wherein each of the plurality of key policies is tailored to an individual application server of the plurality of application servers;

determine whether the existing key is valid in view of the key policy;

in response to determining that the existing key is valid in view of the key policy, provide a copy of the existing key to the application;

record when the copy of the existing key is provided to the application; and apply the key policy to the existing key in view of the recording.

10. The system of claim 9, wherein the hardware processor is further to:

identify a key expiration policy; and manage an expiration of the existing key in accordance with the key expiration policy.

11. The system of claim 10, wherein the hardware processor to identify the key expiration policy, the hardware processor to:

receive an indication of the key expiration policy; and store, in the database, the indication of the key expiration policy.

12. The system of claim 9, wherein the hardware processor is further to:

identify a key destruction policy; and manage a destruction of the existing key in accordance with the key destruction policy.

13. The system of claim 12, wherein the hardware processor to identify the key destruction policy, the hardware processor to:

receive an indication of the key destruction policy; and store, in the database, the indication of the key destruction policy.

14. The system of claim 9, wherein to identify the existing key, the hardware processor to:

examine the key request, in response to the hardware processor to validate the application, to identify an indication of the existing key; and retrieve, from the database, the existing key.

15. The system of claim 9, wherein the first application server is a JAVA™ Enterprise Edition (EE) application server.

16. The system of claim 9, wherein the hardware processor is further to maintain the copy of the existing key in the database.

* * * * *